June 22, 1948.  G. E. KING  2,443,656
WORK AND FEED MOTOR CONTROL SYSTEM
Filed Dec. 5, 1944
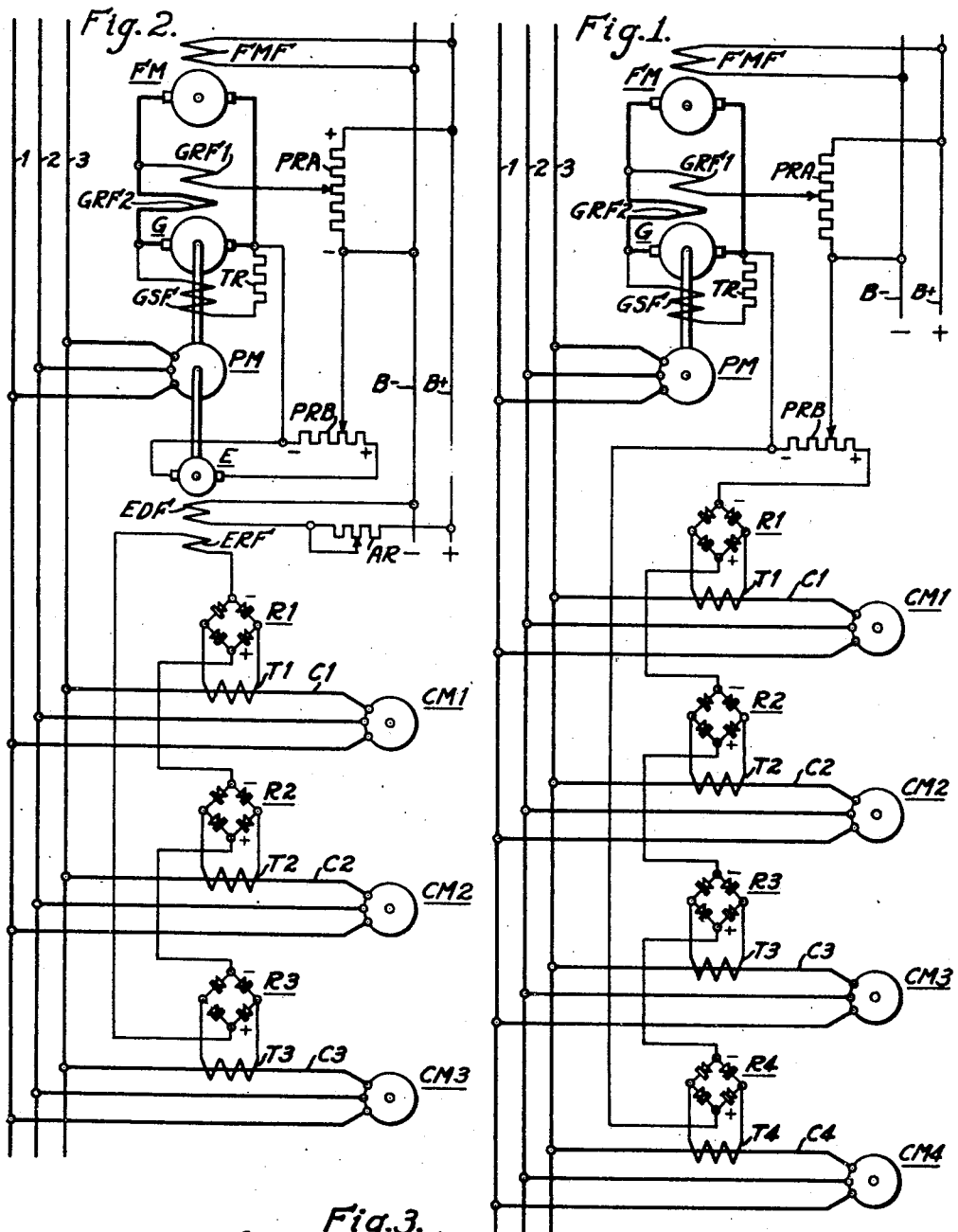
INVENTOR
George E. King.
BY
Paul E. Friedemann
ATTORNEY Patented June 22, 1948

2,443,656

UNITED STATES PATENT OFFICE 2,443,656

WORK AND FEED MOTOR CONTROL SYSTEM

George E. King, Swissvale, Pa., assignor to Westinghouse Electric Corporation, East Pittsburgh, Pa., a corporation of Pennsylvania Application December 5, 1944, Serial No. 566,722

10 Claims. (Cl. 318—39)

This invention in a broad sense relates to electrical systems, and, more particularly, to electrical systems embodying a multiplicity of electrical loads in which the electrical characteristics of any one of such loads depending upon which is the greater, is utilized to produce a regulating quantity and which regulating quantity is utilized to introduce certain desired corrections in the system.

In certain of its aspects this invention is of general utility and may be effectively utilized in electrical systems embodying a plurality of electrical output points in which a control of the system, a control of certain of its elements or a single element thereof is desired in accordance with the most heavily loaded electrical outlet.

The invention by way of illustration but not limitation is illustrated in the drawings as applicable to a feed control system for a milling machine. In a milling machine drive it is desirable to limit the load on the cutters thereof since an overload on any one cutter may cause it to break. A milling machine may have from one to four cutters, each driven by a separate alternating current squirrel cage motor. The work is orinarily fed into the cutters by an adjustable speed direct current motor, i. e., the cutter spindles are usually stationary, and the work piece is fed by one feed motor. Heretofore, the cutters have usually been protected by current relays set to operate at about 150% of full load cutter motor current. One relay was connected in each cutter motor circuit, and the contacts were connected so that if any relay operated, it stopped the feed motor. It is preferable and more efficient to have a control system which maintains a constant load on the milling cutters by varying the speed of the feed motor.

The rate of feed of the feed motor must be regulated by the cutter motor having the greatest load. It has been found that by using current transformers in each cutter motor circuit and connecting them each to individual full wave rectifiers it was possible to obtain the desired results by connecting the direct current terminals of the rectifiers in series relation with each other and the burden. The current in the burden is always proportional to the ratio of the current transformer and the load on the cutter motor carrying the most load, as long as the capacity of the current transformer is not exceeded. The burden hereinbefore referred to may be any suitable regulating device which functions to establish the desired control. In the specific case illustrated in the drawings, in one instance the burden constitutes a resistor element. The voltage drop across this resistor or any tapped portion thereof is utilized to control the speed of the feed motor. In another instance, the burden constitutes the field winding of a small generator or exciter, which exciter serves as an amplifier for the regulating quantity.

A principal object of this invention is to provide an electrical system in which the electrical characteristics of any one of a group of electrical loads may be utilized to produce a regulating quantity and which regulating quantity is utilized to effect a control of the system.

Another and equally important object of this invention is to provide an electrical drive in which the electrical characteristics of any one of a group of electrically operated elements may be utilized to regulate an element to be controlled.

Yet another object of this invention is to provide an electrical system in which an electrical loading which is a departure from a selected loading on any one of a group of electrical loads produces an electrical quantity indicative of the loading, and which electrical quantity is utilized to maintain the selected loading.

A further object of this invention is to provide an electrical drive for effecting relative movement between one element or a group of elements and an element to be controlled in which the rate of relative movement is controlled by the load on said one element or any one of said group of elements.

Further separate and combined objects of this invention are to provide an electrical drive for effecting relative movement between one electrically operated element or a group of such elements and an electrically operated element to be controlled in which the speed of the element to be controlled is adjustably selected for certain operating values, which automatically regulates the speed at the selected value to maintain such selected speed constant, which produces an electrical quantity indicative of departure in loading on said one element or any one of said group of elements, and which utilizes such electrical quantity to effect a further control of the speed of the element to be controlled.

Other objects and advantages will become apparent from a study of the following disclosure when used in conjunction with the accompanying drawings, in which:

Figure 1 schematically illustrates an electric drive applicable to a milling machine, which electric drive embodies the principles of this invention;

Fig. 2 is a modification of the invention illustrated in Fig. 1; and

Fig. 3 diagrammatically illustrates the fundamental principles of the invention illustrated in Figs. 1 and 2.

On certain applications, such as feed drives for small boring mills, grinders, milling machines, etc., the feed motors are relatively small, and hence their electrical capacity or power requirements are small. On such applications as these, it has been found possible to apply a regulating generator, such as G, illustrated in Figs. 1 and 2 to directly energize the motor such as FM which it is controlling. On larger sizes of equipment, it has been the practice to install a main generator to directly energize the driving motor and to regulate such a generator by means of a generator, as G. Thus, it will be understood that the application of the generator G to directly energize the motor is not a limitation in its use since this machine may be used otherwise to control the motor.

Before proceeding with a discussion of the system generally indicated in Fig. 1, an understanding of the motor generator system and its characteristics of operation should be had. In the following discussion the resistor PRB is considered as being shunted from the circuit. The system illustrated comprises generally a feed motor FM which may be utilized to drive the work piece element of a milling machine (not shown). A generator G has its armature winding connected in series with the armature winding of the motor FM. This generator has special operating characteristics which will hereinafter be noted in detail. A prime mover designated PM is utilized to drive the generator G at a constant speed of operation. This prime mover as illustrated is an alternating current motor having constant speed characteristics and is energized from a suitable source of alternating current indicated by the conductors 1, 2 and 3.

The regulating generator G is of the self-energizing type. These properties are obtained by means of its shunt connected field winding GSF which has in series therewith a resistor TR. This shunt field circuit is so adjusted in electrical resistance that the resistance line of the field circuit coincides with the initial straight line portion of the no load saturation curve of the generator. When the shunt field circuit of a generator is so adjusted, the machine may normally have a voltage output equal to the ordinate of any of the points of tangency of the curves. The regulating field windings of this generator GRF1 and GRF2 select the proper operating point of this generator along the tangent curves and keep this operating point constant for any selected set of conditions.

Since it is desired to regulate the speed of the motor FM at any selected level determined by the setting of the potentiometer rheostat PRA, an indication of the counter-E. M. F. of the motor is desired. An indication of the counter-E. M. F. of the motor is obtained from the differential of the motor armature terminal voltage and the I. R. drop of the motor armature. This is obtained in the instant case by connecting the field winding GRF1 in series with tapped portions of the potentiometer rheostats PRA and PRB across the motor armature terminals. This field winding thus has applied thereacross a voltage proportional to the voltage drop across the motor armature terminals. The series field winding GRF2 is energized according to the currents circulating in the motor generator armature circuit. Since these currents vary depending upon the effective electrical resistance of the motor armature, their value at any time is an indication of the I. R. drop of the motor armature. Hence, the excitation of the field winding GRF2 is indicative of the I. R. drop. By differentially connecting the field windings GRF1 and GRF2, such that the excitations thereof thus obtained subtract, the resulting excitation of the machine is an indication of the counter-E. M. F., and hence the departure in speed from the selected speed of the motor.

The maximum speed of the motor is determined by the setting of the potentiometer rheostat PRA. This rheostat has its extremities connected directly across a suitable source of energizing potential indicated by the conductors B+ and B—. By arranging the potential drop across the resistor PRA such that it opposes the voltage drop across the motor armature terminals, the excitation of the field GRF1 resulting from this connection is cumulative with respect to the field GRF2 for motoring conditions. This excitation of the field GRF1 may be termed the pattern excitation since it determines the pattern of operation of the generator G, and hence the motor M. Thus, the differential excitation of field windings GRF1 and GRF2 resulting in an excitation indicative of the counter-E. M. F. of the motor, when matched with the excitation of the field winding GRF1 resulting from the drop across the potentiometer rheostat PRA is an indication that the motor is operating at the desired speed. Should the motor speed drop, the motor armature terminal voltage will also drop. At the same time the motor armature currents due to a decrease in the effective resistance of the motor armature will increase. The differential excitation thus obtained is considerably smaller than the excitation produced by the rheostat PRA which is indicative of the desired speed of operation. Hence, the net excitation of the generator G is in such a direction as to increase the electrical output thereof to thus increase the speed of the motor M. The action of the field windings is thus to shift the operating point of the generator to a higher point on the tangent curves. When the speed of the motor approaches that selected by the setting of the potentiometer rheostat PRA, the net excitation of the regulating field windings drops to zero, and the generator voltage is maintained by reason of its self-energizing properties. Any departure in speed of the motor at this new point of operation of the generator will immediately produce, as before, a corrective output through the action of the regulating field windings to restore the motor speed to the selected level.

The function of the motor generator system illustrated in Fig. 2 of the drawing is the same as that in Fig. 1. Hence, the description just made in connection with Fig. 1 applies equally to the elements of Fig. 2.

Referring now to Fig. 3 of the drawing, a system of transformers and rectifiers is illustrated by which the regulating quantities for controlling the speed of operation of the feed motor are produced. Several theories have been advanced explaining the operation of such a rectifier system and at present the following theory, which is tentatively offered without any desire to be limited to any particular theory of operation, is preferred. It may be stated that the present theory is substantiated by test data. In the illustration three separate conductors C1, C2 and C3, each carrying separate electrical currents of the same phase, form the primaries respectively of the current transformers T1, T2 and T3. Each of these current transformers has a secondary output which is proportional to the current flowing in its associated conductor. Each of these current transformers is connected across the input terminals of a full wave rectifier. These rectifiers are respectively designated R1, R2 and R3. The output terminals of these rectifiers are connected in a series loop with a load so designated in the drawing. Ammeters A1, A2 and A3 are provided in the alternating current sides of the rectifiers to measure the value of the alternating currents. An ammeter designated A is connected in the series loop adjacent the load to measure the direct current in this series circuit. It has been found that by so connecting the output terminals of the rectifiers that a quantity may be measured by the ammeter A which is proportional to the maximum quantity indicated on any one of the ammeters in the alternating current side of the rectifiers. In the illustration the small letters $a$, $b$ and $c$ represent the alternating currents and these same letters when primed represent the corresponding rectified currents. Specifically stated and assuming no resistance in the circuit, if the ammeter A3, for example, indicated a value of 6 amperes and the ammeters A1 and A2 each indicated a value of 4 amperes, it would theoretically be possible for the ammeter A to indicate a value of 6 amperes. This may better be understood by a consideration of the distribution of the current through the transformer and rectifier network. Assuming that of the three conductors the conductor C3 is carrying the greatest current, it will be apparent that the secondary current of the transformer T3 will be the greatest. For an instantaneous condition of alternating currents $a$, $b$ and $c$ respectively, in the secondaries of the transformers T1, T2 and T3 in the directions indicated by the arrows, the output current $c'$ will flow from the positive terminal of the rectifier R3 into the series rectifier loop. Neglecting circuit resistance, this rectified current designated $c'$ in the series loop will be proportional in magnitude to that flowing in the secondary of the transformer T3. The current $c'$ enters the rectifier R2 at its negative terminal and is distributed through the left and right hand branches thereof, the current through the left hand branch being designated $x$ and that through the right hand branch being designated $y$. Thus, the value of $x+y$ may be said to be equal to $c'$, the total current flowing into the rectifier. However, another component of current $b$ introduced into the rectifier R2 by the transformer T2 also flows through this rectifier. The $y$ current flowing through the upper right hand branch of the rectifier will thus have added to it, the component of current $b$. Thus, the total current in this branch is designated $y+b$. At the junction between upper and lower left hand branches of the rectifier R2, the component $x$ is divided. The component $b$ flows through the circuit connected to the transformer T2 while the component $x-b$ flows through the upper left branch of the rectifier. Thus, the two electrical quantities $x-b'$ and $y+b'$ flow out at the positive terminal of the rectifier. The designation $b$ is now changed to $b'$ since the current $b$ has been rectified. The sum of this current again totals $x+y$ which as previously noted was equal to $c'$. Thus, the current flowing from the positive terminal of the rectifier R2 is again equal to $c'$. This value of current flows into the negative terminal of the rectifier R1 and as previously is divided and flows into the left and right hand branches of this rectifier. The current flowing into the left hand branch being designated $m$ and that into the right hand branch being designated $n$. At this point another component of current is introduced. This is the current designated $a$ which is the secondary current of the transformer T1. Thus, for the instantaneous direction indicated, a current value $n+a'$ exists in the upper right hand branch of the rectifier. The current $m$ is divided at the midpoint of the left hand upper and lower branches into the components $a$ and $m-a'$, the component $m-a$ flowing through the upper left hand branch of the rectifier to the positive terminal. Thus, at this output terminal there exists the two quantities of current $m-a'$ and $n+a'$ which when added result in $m+n$ which is equal to the value $c'$ of the current which entered the rectifier. Thus, a load connected in this series loop circuit will be energized according to the magnitude of the current of the most highly energized rectifier. These considerations may be carried out for any number of transformer and rectifier units connected according to the teachings of this invention.

The practical application of the principles illustrated in Fig. 3 utilizes the electrical quantity thus produced to effect a control of the motor FM. In Fig. 1 the load is represented by the potentiometer rheostat PRB, and the electrical quantity appearing across this resistor depends upon the load on any one of the cutter motors designated CM1 to CM4 inclusive depending upon which is the most heavily loaded. By proper adjustment of the rheostat PRB the maximum load for any of the cutter motors can be selected. These cutter motors are connected in parallel circuit with the line designated 1, 2 and 3 and are operated at a substantially uniform speed. Each of the transformers T1 to T4, inclusive, are energized according to the currents traversing one phase of the three-phase supply for these motors. As in Fig. 3, the rectifiers R1 to R4, inclusive, are each energized by one of the transformers. The output terminals of the rectifiers are connected in series with the potentiometer rheostat PRB. Should any one of the cutter motors tend to exceed the set loading the current supply thereto will be greater than that to the other motors. Thus, according to the principles set forth in connection with Fig. 3, the potentiometer rheostat is energized by a quantity indicative of this loading. By connecting the potentiometer rheostat in opposition to the potentiometer rheostat PRA, the effective electrical resistance of the field circuit including the field winding GRF1 is varied, and as a result, the excitation of this field winding is changed. Assuming an increase of current in the conductor C1, a corresponding increase in current flow through the rheostat PRB is produced. Since this current, as previously noted, is in opposition to the current flowing through this circuit, the effective resistance of this circuit is increased with the result that the excitation of the winding GRF1 is decreased. This corresponds to an adjustment of the rheostat PRA to some lower speed setting. As a result, the speed of the motor FM is brought down sufficiently to maintain the selected load on the cutter motor.

In some instances it may be desirable to amplify the electrical quantity applied across the resistor PRB. This may be accomplished in the manner indicated in Fig. 2, in which an exciter E energizes the potentiometer rheostat PRB. This exciter is provided with two field windings, one a differential field winding EDF and the other a regulating field winding ERF. The differential field winding has its ampere turns so selected that they are equal and opposed to those of the regulating field winding ERF when the cutter motors are operating at no load. The ampere turns of the differential field winding may be controlled by suitable adjustment of the adjustable resistor AR. Thus, if the cutter motor CM1 should tend to exceed the set loading, the ampere turns of the regulating field winding will overbalance those of the differential field winding and the exciter will generate an electrical quantity. Thus an electrical current flows through the potentiometer rheostat PRB in opposition to the normal flow of current resulting from the setting of the potentiometer rheostat PRA. Thus again, the excitation of the field winding GRF1 is reduced substantially the same as if the potentiometer rheostat PRA had been moved to a lower speed setting. The motor speed drops sufficiently to maintain the selected loading on the cutter motor. In all other respects Fig. 2 is similar to Fig. 1. Hence, a further description of the operation of this system is believed unnecessary.

The foregoing disclosure and the showings made in the drawing are merely illustrative of the principles of this invention. The only limitations are to be determined from the scope of the appended claims.

I claim as my invention:

1. In an electric drive for regulating a first motor depending upon an overload on any one of a group of motors, the combination of, means for supplying electrical energy to the group of motors to effect operation thereof, means for supplying electrical energy to the first motor to effect its operation, a plurality of rectifiers each energized according to the current energizing one of said group of motors, means connecting said rectifiers in series circuit relationship, and means energized according to the electrical output of said rectifiers for regulating said means for supplying electrical energy to said first motor.

2. In an electric drive for regulating a first motor depending upon an overload on any one of a group of motors, the combination of, means for supplying electrical current to each of said group of motors, means for supplying electrical energy to said first motor, a plurality of rectifiers, means for energizing each of the rectifiers according to the current supplied to one of the group of motors, means for controlling said means for supplying electrical energy to the first motor and means for energizing said last named means according to the electrical output of said rectifiers.

3. In an electric drive for regulating a first motor depending upon an overload on any one of a group of motors, the combination of, means for supplying electrical current to each of the group of motors, means for supplying electrical current to the first motor, a plurality of rectifiers, each energized according to the electrical current supplied to one of the group of motors, means for controlling said means for supplying electrical current to the first motor, and means connecting said rectifiers in series with said last named means.

4. In an electric drive for regulating a first motor depending upon an overload on any one of a group of alternating current motors, the combination of, means for supplying alternating current to the alternating current motors for effecting operation thereof, a generator for energizing the first motor, means for controlling the electrical output of said generator to adjustably effect different set speeds of operation of the first motor, a plurality of transformers, each energized according to the alternating current supplied to one of the machine tool motors, a plurality of rectifiers having their output terminals connected in series circuit relationship and each having their input terminals connected to one of said transformers, and means for further regulating the electrical output of said generator in accordance with the electrical output of said rectifiers.

5. In a machine tool, the combination of, a plurality of cutting tools, a plurality of motors each for driving a cutting tool, a work piece element, a motor for driving the work piece element, means for energizing the cutting tool motors for effecting operation thereof, a generator electrically connected to the work piece motor, a first field winding for the generator excited according to the electrical current supplied to said motor by said generator, a second field winding for the generator differentially arranged with respect to the first field winding, a first resistor, a second resistor, circuit means connecting tapped portions of the first and second resistors in series with the second field winding across the armature terminals of the work piece motor, means for energizing the first resistor, a plurality of rectifiers having their output terminals connected in series, each of said rectifiers being energized in accordance with the electrical current supplied to one of said cutting tool motors, and means for energizing said second resistor in accordance with the electrical output of said rectifiers in opposition to the energization of said first resistor.

6. Apparatus of the character set forth in claim 5 in which said generator is of the self-energizing type and includes a field circuit having an armature current energized field winding, the resistance of the field circuit being such that the resistance line of the field circuit is tangent to the initial straight line portion of the no load saturation curve of the generator.

7. Apparatus of the character set forth in claim 5 in which said last-mentioned means includes means for amplifying the electrical output of said rectifiers.

8. Apparatus of the character set forth in claim 5 in which said last named means includes an exciter connected to energize the second resistor and having a pair of differentially connected field windings, means for supplying electrical energy of substantially constant value to one of said field windings, and the other field winding being energized according to the electrical output of said rectifiers.

9. Apparatus of the character set forth in claim 5 in which said generator is of the self-energizing type and includes a field winding and a resistor in series therewith connected in shunt circuit with the generator armature, said resistor producing a total resistance of the field circuit such that the resistance line thereof is tangent to the initial straight line portion of the no load saturation curve of the generator.

10. In an electric drive for regulating a first motor depending upon an overload on any one of a plurality of motors, the combination of, means for energizing each of the plurality of motors for effecting operation thereof, a generator for energizing the first motor, means for adjustably controlling the electrical output of said generator for effecting selected set speeds of operation of said motor, means for automatically controlling the electrical output of said generator for maintaining a selected motor speed constant, a plurality of rectifiers each energized according to the electrical current supplied to one of said plurality of motors, means connecting the output terminals of said rectifiers in series, and means responsive to the electrical output of said rectifiers for controlling the electrical output of the generator.

GEORGE E. KING.

REFERENCES CITED

The following references are of record in the file of this patent:

UNITED STATES PATENTS

| Number | Name | Date |
| --- | --- | --- |
| 1,960,091 | Schultz | May 22, 1934 |
| 2,240,699 | Harder et al. | May 6, 1941 |
| 2,340,060 | King et al. | Jan. 5, 1944 |
| 2,384,375 | Hagward | Sept. 4, 1945 |